Patented June 19, 1951

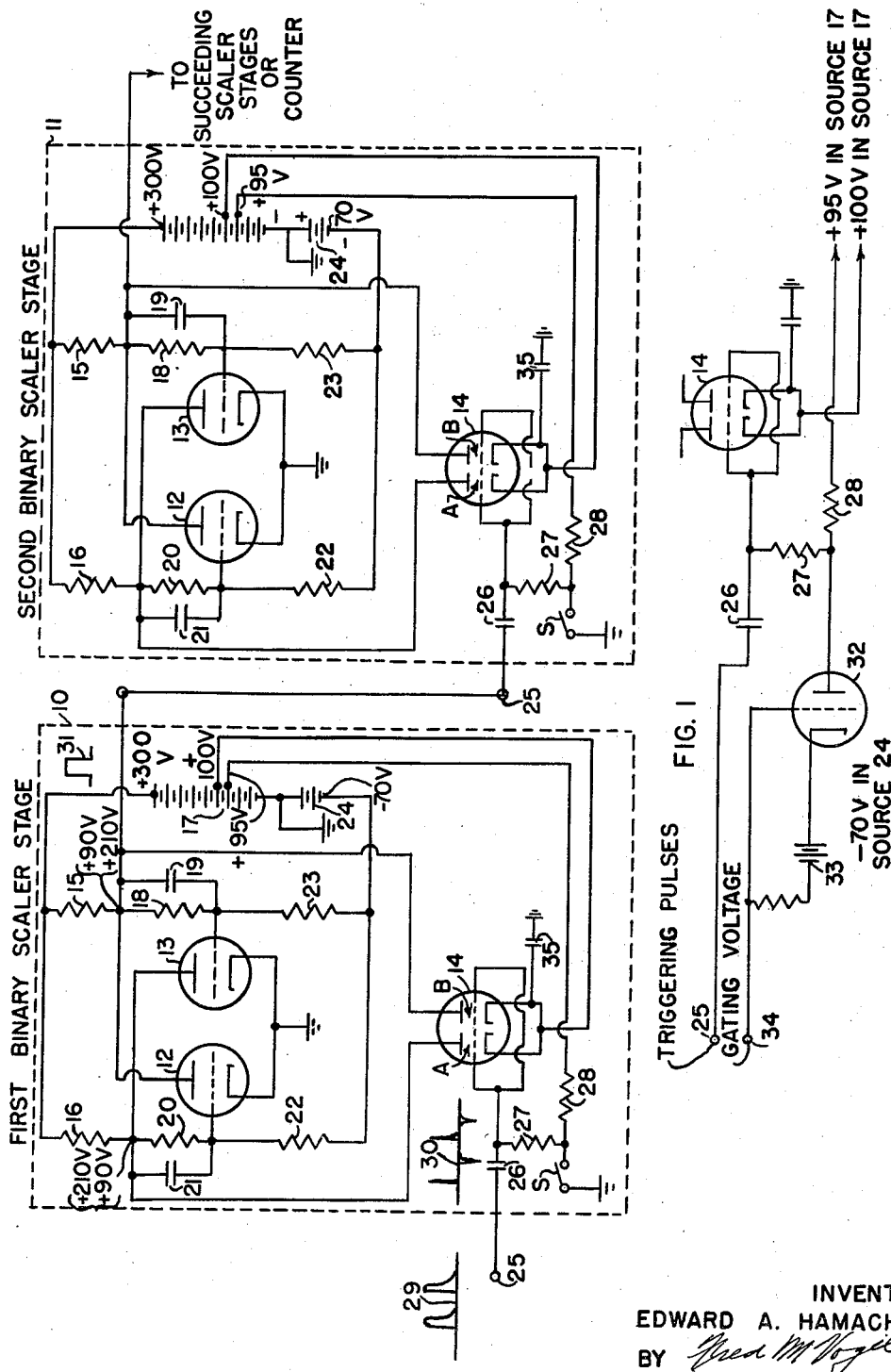

2,557,186

UNITED STATES PATENT OFFICE 2,557,186

ELECTRONIC TRIGGER CIRCUIT PULSE SCALING SYSTEM

Edward A. Hamacher, Irvington-on-Hudson, N. Y., assignor to Philips Laboratories, Inc., Irvington-on-Hudson, N. Y.

Application February 19, 1949, Serial No. 77,394

3 Claims. (Cl. 250—27)

This invention relates to electronic trigger circuits and more particularly to a trigger circuit embodying a tripping device and adapted to function in a scaling system.

A trigger circuit is an arrangement having two conditions of equilibrium, a rapid shift from one condition to the other being effected by the application of a pulse or other external influence. One well known form of trigger circuit is the Eccles-Jordan system which is basically constituted by a two-stage, direct-coupled, vacuum tube amplifier wherein the output of the second stage is back-coupled to the input of the first stage. The Eccles-Jordan circuit has two stable quiescent conditions: one in which the first tube passes anode current and the second tube no current, and the second, which is similar to the first, save that the second tube conducts while the first is disabled. If a trigger pulse is impressed on the grid of the tube which at the moment happens to be biased to cut-off, then an amplifying action takes place causing the system to trip from the original to the alternate condition.

It is conventional, in using the Eccles-Jordan system as a scaling or counting device, to derive a pulse from the phenomenon to be counted and to impress said pulse simultaneously to the control grids of both tubes through suitable coupling condensers so that each time a pulse arrives both tubes are momentarily disabled and thereafter the trigger circuit shifts to the alternate quiescent condition regardless of which condition existed prior to the pulse arrival.

Consequently, it takes two pulses in sequence to bring about a complete cycle of operation such that at the end of the cycle the trigger circuit is restored to its condition just before the advent of the first of the two pulses. By deriving one new pulse for each such operating cycle and applying the new pulse to a second triggering circuit that will require two of the new pulses to undergo a full cycle, for each operating cycle of the second triggering circuit four original pulses are entailed. Thus by cascading trigger circuits, each acting as a binary scaler, the rate of occurrence of random phenomenon, as produced for example by a Geiger-Muller tube, can be scaled down to a point where such events can be counted by relatively slow-acting electromagnetic counters.

One disadvantage which arises in applying the triggering pulse to the grids of both tubes of the triggering circuit through coupling capacitors is that the pulse must be of relatively large amplitude to effect a transfer action in the circuit. Moreover, the resolving time of a triggering circuit operated in this manner is relatively long so that the circuit will not respond accurately to pulses which arrive in extremely rapid order, for example with a 5 microsecond spacing or less between successive pulses.

Accordingly, it is the principal object of the invention to provide a triggering circuit arrangement which is responsive to pulses of relatively small amplitude and which exhibits a rapid transfer action, hence a short resolving time.

More particularly, it is an object of this invention to afford a scaling system including a trigger circuit actuated by a tripping device wherein for each incoming pulse, an impulse is impressed on the grid of but one of the trigger circuit tubes to effect a rapid transfer action, the succeeding impulse being imposed on the grid of the other tube.

It is a further object of this invention to provide switching means, in conjunction with a trigger circuit, adapted instantaneously to render the circuit insensitive to input pulses even when said pulses are of relatively large amplitude and without producing a spurious response.

For an understanding of the invention as well as other objects and further features thereof, reference is made to following detailed description of the invention to be read in connection with the accompanying drawing wherein identical elements in the figures are designated by like reference numerals.

In the drawings:

Fig. 1 is a schematic circuit diagram of a preferred embodiment of a pulse scaling system in accordance with the invention, and Fig. 2 is a schematic circuit diagram of a modification of the tripping circuit in the system illustrated in Fig. 1.

Referring now to Fig. 1, there is shown in separate dotted line blocks the first two binary scaler stages 10 and 11 of a scaling system, the output of the second stage being fed either into succeeding stages in cascade relation for the purpose of further scaling the pulses or, if preferred, directly to a counting mechanism. The scaler stages 10 and 11 have identical circuit arrangements, each stage including a pair of three-element, electron discharge tubes 12 and 13, and a duo-triode electron discharge tube 14 whose respective sections are designated by the letters A and B.

Tubes 12 and 13 are arranged in an Eccles-Jordan trigger or "flip-flop" circuit, the cathodes thereof being interconnected to ground and the anodes being connected through voltage-dropping resistors 15 and 16, respectively, to the positive terminal of a high voltage source 17 whose negative terminal is grounded. The anode of tube 12 is coupled through a resistor 18 in parallel with a condenser 19 to the control grid of tube 13, while the anode of tube 13 is coupled through a resistor 20 in parallel with a condenser 21 to the control grid of tube 12. The grids of tubes 12 and 13 are connected through resistors 22 and 23, respectively, to the negative terminal of a bias voltage source 24 whose positive terminal is grounded.

The anode of section A, tube 14, is connected to the anode of tube 13, while the anode of section B, tube 14, is connected to the anode of tube 12. The cathodes of sections A and B, tube 14, are connected in common to a first positive tap in source 17. The grids of sections A and B, tube 14, are interconnected. The phenomenon to be counted is applied to the input terminal 25 of the first scaler stage 10, the terminal being coupled through capacitor 26 to the interconnected grids of tube 14. The interconnected grids of tube 14 are also connected through resistor 27 in series with resistor 28 to a second positive tap in source 17, intermediate the first positive tap and the negative terminal thereof. The junction of resistors 27 and 28 is connected via a normally-open switch S to ground. The output of the first scaler stage 10 is taken from the anode of tube 12 and is applied to the input terminal 25 of the next stage. A by-pass condenser 35 is connected between the interconnected cathodes of tube 14 and ground.

The operation of a binary scaler stage will now be explained. Let us assume that the original quiescent condition of the trigger circuit including tubes 12 and 13 is such that tube 12 carries a heavy anode current, whereas tube 13 carries no anode current. In this condition, the current flow through tube 12 passes through resistor 15 to develop a voltage drop thereacross which reduces the voltage on the anode of tube 12 and results in a cut-off bias on the grid of tube 13. As no current is carried by tube 13, no reduction in anode voltage thereon results, hence the voltage appearing on the anode of tube 13 is high relative to that on the anode of tube 12.

Accordingly, as the anode of sections A and B of tube 14 are connected to the anodes of tubes 13 and 12, respectively, the voltage established on the anode of section A is higher than that on section B. The magnitude of voltage on the interconnected cathodes of tube 14 with respect to that on the interconnected grids of tube 14 is such that both sections of the tube are normally biased to cut off so that the original quiescent condition of the trigger circuit is not disturbed thereby.

With a view to clarifying the behaviour of the circuit, we shall assign arbitrary voltage values to the various electrodes of the system in the original quiescent stage. The positive terminal voltage of voltage source 17 shall be assumed to be +300 volts, the first positive tap, +100 volts, and the second positive tap, +95 volts. The negative bias voltage from source 24 shall be assumed to be −70 volts. During the conduction of tube 12 in the original quiescent condition, the resultant positive voltage established on the anode thereof shall be +90 volts, while that on the anode of non-conducting tube 13, +210 volts. Consequently, the anode voltage of section A, tube 14, is +210 volts as against a cathode voltage of +100 volts, whereas the anode voltage of section B, tube 14, is +90 volts as against a cathode voltage of +100. Hence, in the original quiescent condition of the trigger circuit, only section A is capable of being rendered conductive.

We will now consider the operation of the system upon the arrival of two positive signal voltages, having a shape such as shown in the wave pattern 29, at input terminal 25. Condenser 26 in combination with resistor 27 acts as a differentiating network so that for each incoming signal a positive triggering pulse, as shown in pattern 30, is produced whose position corresponds to the leading edge of the impulse as well as a negative pulse at the trailing edge. The first positive triggering pulse which is applied to the interconnected grids of sections A and B, tube 14, renders only section A conductive, thereby causing a voltage drop in resistor 16 which results in a cut-off bias on the grid of tube 12, disabling said tube and tripping the trigger circuit to the alternate quiescent condition.

In the alternate quiescent condition, the voltage values on the anodes of tubes 12 and 13 as well as on the anodes of sections A and B, tube 14, are reversed so that now only section B of tube 14 is capable of being rendered conductive. Thus when the second positive triggering pulse is applied to the interconnected grids of tube 14, only section B is rendered conductive thereby causing a voltage drop in resistor 15 with a resultant cut-off bias on the grid of tube 13 to trip the trigger circuit so that it reverts to its original quiescent condition. It will be obvious that the negative pulses produced by the differentiating circuit 26, 27 have no effect on the operation of tube 14 and therefore may be disregarded.

Thus for every two triggering pulses successively applied to tripping tube 14 of the first scaler stage 10, the triggering circuit undergoes a full cycle of operation thereby developing at the anode of tube 12 a single cycle of a rectangular wave, as shown by pattern 31. The rectangular wave is fed to input terminal 25 of the second stage which differentiates the rectangular wave so that a single positive triggering pulse is derived from each cycle thereof. Therefore in the second stage two cycles of a rectangular input wave are needed to produce a single cycle of rectangular output wave. It will now be evident that for every four signal voltages fed to the input of the first stage, a single cycle of wave will emerge in the output of the second stage, which single cycle may be counted directly by an electromagnetic counter or similar means to provide readings in a scale ratio of four. If preferred, many additional stages may be provided in cascade relation to effect larger scale ratios.

Inasmuch as tripping tube 14 functions to apply a triggering pulse to alternate tubes of the trigger circuit rather than to both tubes simultaneously, the transfer action occurs immediately upon the application of the trigger pulse rather than during the removal of the trigger pulse. This feature makes possible a shorter resolving time whereby the trigger circuit will respond to incoming pulses which arrive in extremely short sequence. Moreover, the tripping tube 14 is sensitive to triggering pulses of relatively low height so that pulse skipping will not occur and more accurate readings obtained.

By means of switch S, the tripping circuit can be easily and reliably turned off, that is, rendered totally insensitive to input signal. When switch S is closed the interconnected grids of tube 14 are grounded through resistor 27 so that the voltage on the grids is now highly negative with respect to the cathode; specifically, when the switch is closed a −100 volt bias is impressed on the grid as against a −5 volt bias when the switch is open. This feature is important for interpolation purposes when the binary stages are arranged in cascade relation to yield large scaling ratios. No spurious counts are introduced by this method of turning off the stage. All stages of a scaling system comprising a plurality of these binary stages can be turned off simultaneously to assure complete locking-in of all counts left in the scaler, for accurate interpolation. It is also to be pointed out that switch S and resistor 28 in the first stage may be common to all stages thus providing concurrent locking-in of all stages.

For the purpose of effecting precise timing in the operation of the scaling system, the switching action performed by switch S can be brought about electronically, as shown separately in Fig. 2, by replacing switch S with an electron discharge tube 32 having a control electrode, the anode of the tube being connected to the junction of resistors 27 and 28 and the cathode being connected to the negative terminal of source 24. Thus the anode voltage across the tube is +165 volts. The grid is cut-off biased by means of a bias source 33. By impressing a positive gating voltage on terminal 34 connected to the grid of tube 32, the tube is rendered conductive to thereby disable tripping tube 14 for the duration of the gating voltage and turn off the triggering circuit.

In one practical embodiment of the scaling system, the elements of the binary stages possessed the following values:

Tubes 12 and 13—Duo-Triode 6SL7
Tube 14—Duo-Triode 6SL7
Resistors 15 and 16—50 k. ohms, each
Resistors 18 and 20—150 k. ohms, each
Resistors 22 and 23—70 k. ohms, each
Resistors 27 and 28—100 k. ohms, each
Condensers 19, 21 and 26—100 mmf., each It is to be understood, of course, that the circuit is not limited to the above listed values. It will also be appreciated, that while the trigger circuit has been illustrated for purposes of simplicity as employing triode tubes, trigger circuits embodying pentodes and other multi-element tubes may be employed with like success.

While the invention has been illustrated in preferred embodiments, it will be obvious that many changes and modifications may be made therein without departing from the essence of the invention. It is intended in the annexed claims to cover all such changes and modifications as fall within the true spirit and scope of the invention.

What I claim is:

1. An electronic scaling system responsive to successive input pulses comprising a series of impulse-producing trigger circuits each including a pair of electron discharge tubes having a cathode, a control electrode and an anode and means to apply operating potentials thereto, said circuits having two quiescent conditions of equilibrium where in one condition one of said tubes is conductive while the other is not and in an alternate condition the other of said tubes is conductive and the one is not, a like series of tripping devices coupling said trigger circuits in cascade relation, each device operating in conjunction with a corresponding trigger circuit and including a pair of electron discharge systems having a cathode, a grid and a plate, said grids being interconnected, said plates being connected to the respective anodes of said tubes, means biasing said systems to cut off, and means to apply to the interconnected grids of said systems triggering pulses having a magnitude relative to the potentials on the plates of said systems at which solely the system whose plate is connected to the anode of a non-conductive tube is rendered conductive, the triggering pulses for the first device being derived from the input signals and the triggering pulses for the succeeding devices being derived from the impulses produced in the respective trigger circuits, switching means common to all of said tripping devices, and means to impose a relatively heavy bias on the discharge systems in all of said tripping devices through said common switching means to render all of said devices insensitive to said triggering pulses.

2. An electronic scaling circuit, as set forth in claim 1, wherein said common switching means and said means to impose a relatively heavy bias is constituted by a voltage source connected to said interconnected grids through a grid-controlled electron discharge tube, and further including means to apply a gating voltage to the grid of said tube to render said tube conductive and thereby impose said bias on said interconnected grids.

3. An electronic scaling system responsive to successive input pulses comprising a series of impulse-producing trigger circuits each including a pair of electron discharge tubes having a cathode, a control electrode and an anode and means to apply operating potentials thereto, said circuits having two quiescent conditions of equilibrium where in one condition one of said tubes is conductive while the other is not and in an alternate condition the other of said tubes is conductive and the one is not, a like series of tripping devices coupling said trigger circuits in cascade relation, each device operating in conjunction with a correspondingly positioned trigger circuit and including a pair of electron discharge systems having a cathode, a grid and a plate, said grids being interconnected, said plates being connected to the respective anodes of said tubes, means biasing said systems to cut off and means to apply a triggering pulse to the interconnected grids of said systems having a magnitude relative to the potentials on the plates of said systems at which solely the system whose plate is connected to the anode of a non-conductive tube is rendered conductive, means including a separate differentiating circuit for each device to derive the triggering pulses for the first device from the input signals and the triggering pulses for the succeeding devices from the impulses produced in respective trigger circuits, switching means common to all of said tripping devices, and means to impose a relatively heavy bias on the interconnected grids of the discharge systems in all of said tripping devices through said common switching means to render all of said devices insensitive to said triggering pulses.

EDWARD A. HAMACHER.

REFERENCES CITED

The following references are of record in the file of this patent:

UNITED STATES PATENTS

| Number | Name | Date |
|---|---|---|
| 2,348,016 | Michel | May 2, 1944 |
| 2,366,357 | Schlesinger | Jan. 2, 1945 |
| 2,402,989 | Dickinson | July 2, 1946 |
| 2,410,703 | Berkoff et al. | Nov. 5, 1946 |

OTHER REFERENCES

Review of Scientific Instruments, vol. 8, November 1937, "A Vacuum Tube Circuit for Scaling Down Counting Rates," by Stevenson et al., pages 414–416.